United States Patent
Radhakrishnan et al.

(10) Patent No.: US 7,302,451 B2
(45) Date of Patent: Nov. 27, 2007

(54) FEATURE IDENTIFICATION OF EVENTS IN MULTIMEDIA

(75) Inventors: Regunathan Radhakrishnan, Quincy, MA (US); Isao Otsuka, Nagaokakyo (JP); Ajay Divakaran, Burlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 454 days.

(21) Appl. No.: 10/922,781

(22) Filed: Aug. 20, 2004

(65) Prior Publication Data

US 2005/0251532 A1 Nov. 10, 2005

Related U.S. Application Data

(63) Continuation-in-part of application No. 10/840,824, filed on May 7, 2004.

(51) Int. Cl.
*G06F 17/00* (2006.01)
(52) U.S. Cl. .................. 707/104.1; 707/100; 707/101; 707/102
(58) Field of Classification Search .......... 707/1–104.1
See application file for complete search history.

(56) References Cited

U.S. PATENT DOCUMENTS

| | | | |
|---|---|---|---|
| 6,606,095 B1 * | 8/2003 | Lengyel et al. ............. | 345/473 |
| 6,697,523 B1 | 2/2004 | Divakaran et al. .......... | 382/173 |
| 6,990,628 B1 * | 1/2006 | Palmer et al. ............. | 715/500 |
| 6,996,572 B1 * | 2/2006 | Chakrabarti et al. ........ | 707/102 |
| 7,103,225 B2 * | 9/2006 | Yang et al. ................ | 382/225 |

OTHER PUBLICATIONS

Bouman, C. A. Cluster: An unsupervised algorithm for modeling gaussian mixtures. http://www.ece.purdue.edu/>bouman. School of Electrical Engineering, Purdue University, pp. 1-18.

R.Radhakrishnan, A.Divakaran and Z.Xiong. A technical report on time series clustering based framework for multimedia mining and summarization. http://www.merl.com/papers/TR2004-046/, MERL Technical Report (2004), pp. 1-8.

Y. Rui, A.Gupta and A.Acero. Automatically extracting highlights for tv baseball programs. *Proc. of ICME* (2000), 11 pages.

Rainer, "Automatic text recognition for video indexing," Proc. ACM Multimedia, 1996, pp. 4-13.

Aner et al., "Video summaries through mosaic-based shot and scene clustering," Proc. European Conference on Computer Vision, 2002, 15 pages.

Pan et al., "Detection of slow-motion replay segments in sports video for highlights generation," Proc. IEEE International Conf. on Acoustics, Speech and Signal Processing, 2001, 4 pages.

(Continued)

*Primary Examiner*—Don Wong
*Assistant Examiner*—Linh Black
(74) *Attorney, Agent, or Firm*—Dirk Brinkman; Clifton D. Mueller; Gene V. Vinokur

(57) ABSTRACT

A method detects events in multimedia. Features are extracted from the multimedia. The features are sampled using a sliding window to obtain samples. A context model is constructed for each sample. The context models form a time series. An affinity matrix is determined from the time series models and a commutative distance metric between each pair of context models. A second generalized eigenvector is determined for the affinity matrix, and the samples are then clustered into events according to the second generalized eigenvector.

17 Claims, 10 Drawing Sheets

OTHER PUBLICATIONS

Sundaram et al., "Determining computable scenes in films and their structures using audio-visual memory models," ACM Multimedia, 2000, 10 pages.

Wu et al., "Multi-camera spatio-temporal fusion and biased sequence data learning for security surveillance," ACM Multimedia, 2003, pp. 1-8.

Shi et al., "Normalized cuts and image segmentation," *Proc. of IEEE Conference on Computer Vision and Pattern Recognition*, 1997, pp. 731-737.

Sheather et al., "A reliable data-based bandwidth selection method for kernel density estimation," *J.R. Statist. Society*, 1991, pp. 683-690.

* cited by examiner

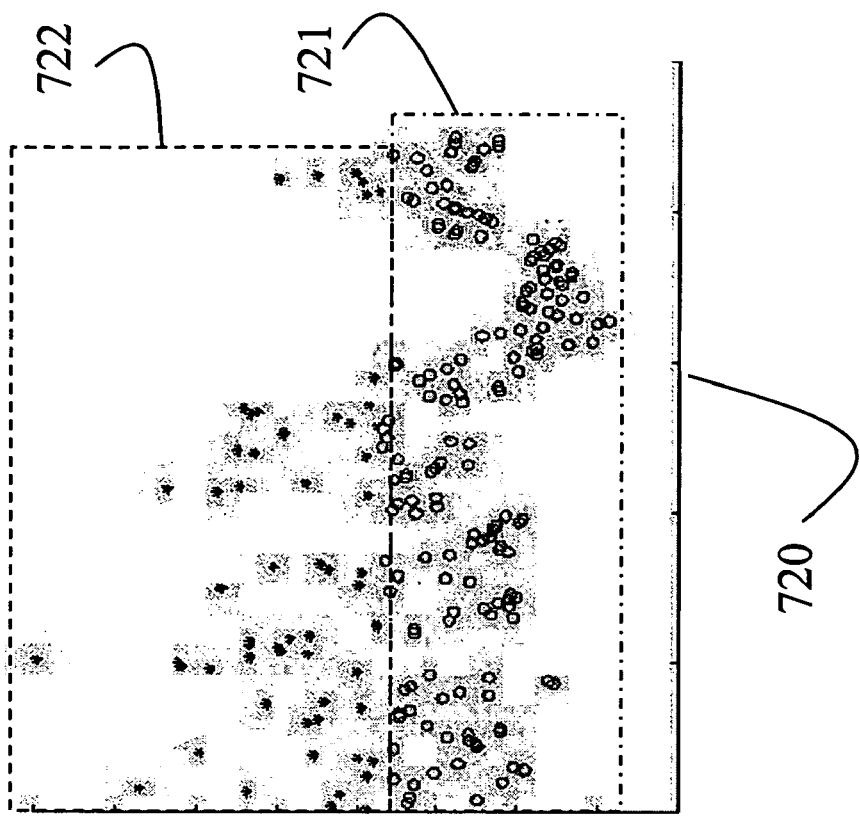
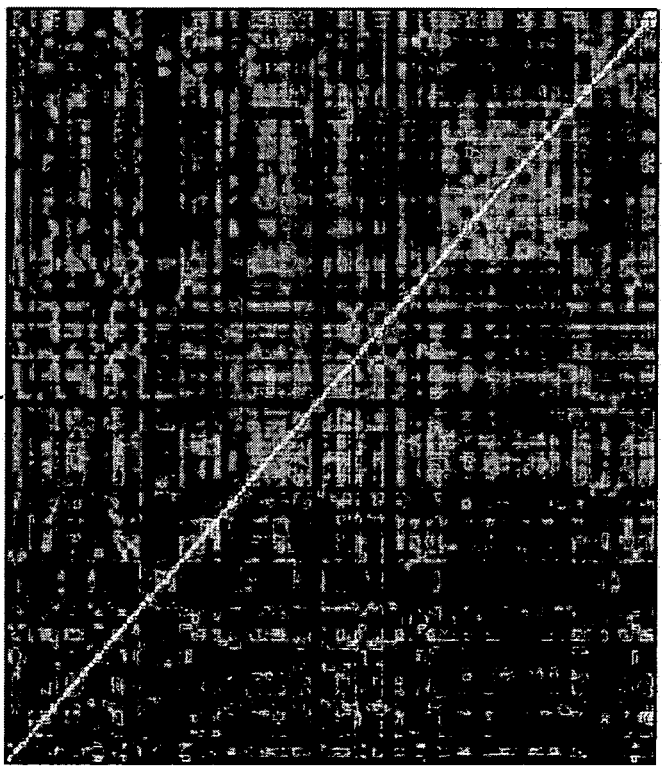
Fig. 7

FEATURE IDENTIFICATION OF EVENTS IN MULTIMEDIA

RELATED APPLICATION

This Patent application is a continuation-in-part of U.S. patent application Ser. No. 10/840,824, "Multimedia Event Detection and Summarization," filed on May 7, 2004 by Radhakrishnan et al.

FIELD OF THE INVENTION

This invention relates generally to analyzing multimedia, and more particularly to identifying features associated with usual events in the multimedia.

BACKGROUND OF THE INVENTION

Most prior art methods for summarizing multimedia content have focused on detecting known patterns of events in the content to provide a summary of the content. As a result, the patterns of events that are useful for summarizing are limited to particular known genres of multimedia. It is also well known how to extract the patterns using supervised statistical learning tools.

For the genre of news videos, detection of 'story' boundaries, by closed caption text, speech transcript analysis, and speaker-based segmentation have been shown to be useful, Rainer, "Automatic text recognition for video indexing," Proc. ACM Multimedia, 1996, and Hsu et al., "A statistical framework for fusing mid-level perceptual features in news story segmentation," Proc. of ICME, 2003.

For the genre of situation comedies, detection of physical settings using mosaic representation of a scene, and detection of leading cast characters using audio-visual cues have been shown to be useful, Aner et al., "Video summaries through mosaic-based shot and scene clustering," Proc. European Conference on Computer Vision, 2002, and Li, "Content-based video analysis, indexing and representation using multimodal information," Ph.D Thesis, University of Southern California, 2003.

For sports video summarization, some methods detect domain-specific events that are correlated with highlights using audio-visual cues, Pan et al., "Detection of slow-motion replay segments in sports video for highlights generation," Proc. IEEE International Conf. on Acoustics, Speech and Signal Processing, 2001, and Xu et al., "Creating audio keywords for event detection in soccer video," Proc. of ICME, 2003. Another method extracts play-break segments in an unsupervised manner, Xie et al., "Unsupervised mining of statistical temporal structures in video," Video Mining, Rosenfeld et al. Eds, Kluwer Academic Publishers, 2003.

For movie content, detection of syntactic structures, such as scenes with only two speakers, and the detection of 'unusual' events, such as explosions have been shown to be useful, Sundaram et al., "Determining computable scenes in films and their structures using audio-visual memory models," ACM Multimedia, 2000.

For surveillance content, detection of 'unusual' events using object segmentation and tracking from video has been shown to be effective, Wu et al., "Multi-camera spatio-temporal fusion and biased sequence data learning for security surveillance," ACM Multimedia, 2003.

The following U.S. Patents and Patent Applications also describe methods for extracting features and detecting events in multimedia, and summarizing multimedia, U.S. patent application Ser. No. 09/518,937, "Method for Ordering Data Structures in Multimedia," filed Mar. 6, 2000 by Divakaran, et al., U.S. patent application Ser. No. 09/610,763, "Extraction of Semantic and Higher Level Features from Low-Level Features of Multimedia Content," filed on Jul. 6, 2000, by Divakaran, et al., U.S. Pat. No. 6,697,523, "Video Summarization Using Motion and Color Descriptors," issued to Divakaran on Feb. 24, 2004, U.S. patent application Ser. No. 09/845,009, "Method for Summarizing a Video Using Motion Descriptors," filed on Apr. 27, 2001 by Divakaran, et al., U.S. patent application Ser. No. 10/610,467, "Method for Detecting Short Term Unusual Events in Videos," filed by Divakaran, et al. on Jun. 30, 2003, and U.S. patent application Ser. No. 10/729,164, "Audio-visual Highlights Detection Using Hidden Markov Models," filed by Divakaran, et al. on Dec. 5, 2003. All of the above are incorporated herein by reference.

Even though it is known how to detect specific events for some specific genres of multimedia, a generalized detection task remains a problem due to intra-genre variations as a result of differing multimedia production styles used by different content providers, and other factors. For instance, events in surveillance videos can never be anticipated. Otherwise surveillance videos would not be necessary. Thus, it is impossible to construct supervised models for event detection for many genres of videos.

An additional problem is to identify specific features in the content that are associated with specific events. For example, identifying which types of visual and audio cues are available in the content to assist the task of event detection.

Clearly, there is a need for a method that can identify features that are associated with events.

Following are some of the desired requirements for multimedia summarization and event detection.

First and foremost, the method should be content-adaptive and unsupervised. Second, the method should have a common feature extraction and statistical analysis framework to discover patterns of events. Then, the same feature extraction process can be used as a front-end for all genres of multimedia, and the same post-processing stage can act upon discovered patterns to identify events, even if the meaning of what is unusual changes depending on the genre of the multimedia. The method should also incorporate a ranking scheme for detected events so that an appropriate summary can be determined.

SUMMARY OF THE INVENTION

The present invention detects temporal patterns of events in multimedia content independent of the genre. The invention uses a unified, content-adaptive, unsupervised learning framework to bring out such temporal patterns from different genres of multimedia.

The method formulates the problem of pattern detection as a time series clustering problem. Sequences of audio and visual features are extracted from the multimedia. The features are treated as time series. The time series data are represented by models, using a windowing process. The modeled time series are used to construct an affinity matrix. An eigenvector analysis and clustering of the eigenvectors leads to a detection of unusual events.

For each detected outliers, a confidence measure is defined in terms of a probability. A relationship is established between learning parameters and the confidence measure using bootstrapping and kernel density estimation. Thereby, the invention enables a systematic method to select the learning parameters for any genre of multimedia. In addition, the method identifies specific features that are most likely associated with unusual events.

BRIEF DESCRIPTION OF THE DRAWINGS

FIG. 7 is an affinity graph and an associated clustering of features.

DETAILED DESCRIPTION OF THE PREFERRED EMBODIMENT

Figure 1:
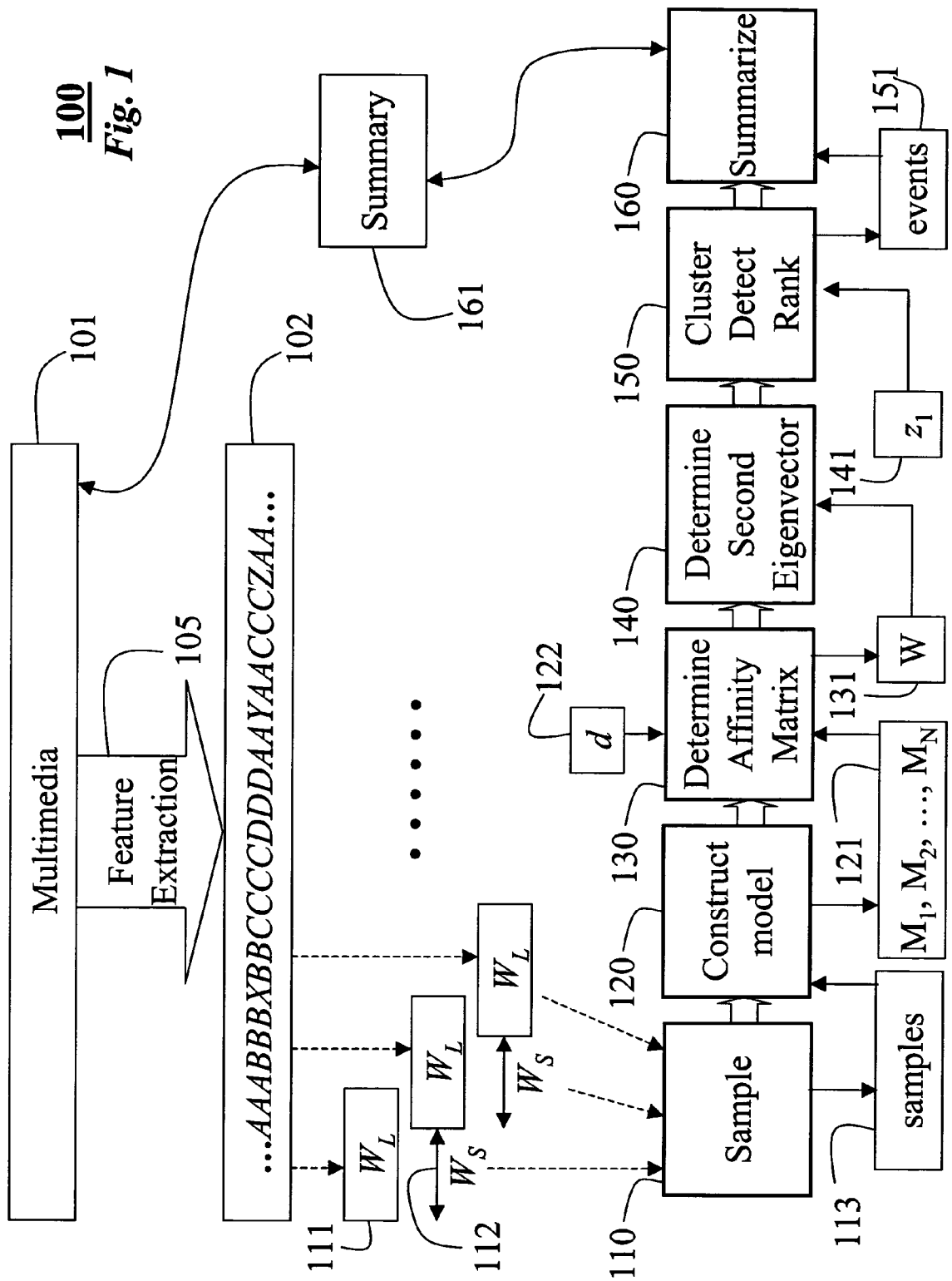
FIG. 1 is a flow diagram of a method for detecting unusual events in multimedia content according to the invention.

Our invention is based on the observation that foreground 'unusual' events in multimedia, e.g., a video, occur sparsely among a background of 'usual' events. Some examples of unusual events include the following. In a sports program, most of the audio portion of the program is dominated by play commentary. However, occasionally, a burst of overwhelming audience reaction, e.g., cheering, clapping, and waving, follows the relatively rare scoring events. In a situation comedy program, a burst of laughter typically follows a comical event, among a background of mundane dialogue. In a surveillance video, a burst of motion or loud noise follows a suspicious event in a mostly silent or static background.

This motivates us to formulate the problem of detecting unusual events in multimedia as that of detecting 'outliers'. We model statistically a mostly stationary background process in terms of audio and visual features extracted from the multimedia, even though the background process is stationary only for small periods of time, and can change over time. This implies that background modeling is performed adaptively throughout the temporally evolving content. This also implies that the modeling can be sufficient to deal with one background process at a time to detect the outliers.

A dominant or 'usual' class of events in multimedia can be represented by $C_1$. These usual events can be thought of as a background process in the multimedia. An 'unusual' class of events in the multimedia can be represented by $C_2$. These unusual events can be thought of as a foreground process.

If a sequence of features is extracted for the two the classes of events ($C_1$ and $C_2$) in the temporal multimedia corresponds to

. . . $C_1C_1C_1C_1C_1C_2C_1C_1C_1C_1C_1C_1C_1C_2C_1C_1C_1C_1C_1$ $C_1$ . . . , then the problem of detecting unusual events is that of finding the occasional unusual, foreground events $C_2$, among all of the usual, background events $C_1$, and the corresponding times of occurrences of their realizations.

To begin with, the statistics of the usual events of class $C_1$ are assumed to be stationary, at least with respect to the time periods of infrequent unusual events. However, there is no such assumption about the unusual events of class $C_2$. The class $C_2$ events can even be a collection of a diverse set of random processes. The only requirement is that the number of occurrences of unusual events $C_2$ is relatively small compared to the much larger number of occurrences of the dominant class of usual events $C_1$.

Note that this formulation is a special case of a more general problem, namely clustering of a time series in which a single highly dominant process does not necessarily exist.

We treat the sequence of features extracted from the video as a time series and perform a temporal segmentation of the time series to detect transition points and outliers from the extracted features.

Segmentation Using Eigenvector Analysis of an Affinity Matrix

Segmentation using eigenvector analysis has been described for a static image, Shi et al., "Normalized cuts and image segmentation," Proc. of IEEE Conference on Computer Vision and Pattern Recognition, 1997. That segmentation is related to graph theoretic formulation of grouping. A set of points in an arbitrary feature space V is represented as a weighted undirected graph, where each node of the graph is a point in a feature space, and an edge is formed between every pair of nodes. A weight on an edge expresses a similarity of the pair of nodes. The similarity between nodes i and j can be represented by the weight w(i, j) on the edge.

In order to understand a partitioning criterion for the graph, consider partitioning the graph into two clusters A and B, such that $A \cup B = V$, where V is the entire feature space, then $$N_{cut}(A, B) = \frac{\sum_{i \in A, j \in B} w(i, j)}{\sum_{i \in A, j \in V} w(i, j)V} + \frac{\sum_{i \in A, j \in B} w(i, j)}{\sum_{i \in B, j \in V} w(i, j)V}. \quad (1)$$

Shi et al. describe how minimizing $N_{cut}$ minimizes a similarity between clusters, while maximizing the association within individual clusters. Shi et al. also describe that $$\min_x N_{cut}(x) = \min_y \frac{y^T(D-W)y}{y^T D^T}, \quad (2)$$

with a condition $y_i \in \{-1, b\}$. Here, W is a symmetric affinity matrix of size N×N, which includes similarities between nodes i and j, w(i, j) as entries, D is a diagonal matrix with $d(i, i) = \Sigma_j w(i, j)$, and $y^T$ represents a transpose of vector y. The parameters x and y are cluster indicator vectors, i.e., if y(i) equals −1, then a feature point 'i' belongs to cluster A, else the feature point belongs to cluster B. It is also known that the solution to the above equation is same as a solution to the following generalized eigenvalue system if y is relaxed to take on real values, $$(D-W)y = \lambda Dy, \quad (3)$$

where $\lambda$ is the corresponding eigenvalue of eigenvector y.

This generalized eigenvalue system is solved by first transforming the system into a standard eigenvalue system by substituting $z = D^{1/2}y$ to obtain $$D_i^{-1/2}(D-W)D^{-1/2}z = \lambda z. \quad (4)$$

It can be verified that the first eigenvector $z_0 = D^{1/2}\vec{1}$ is a trivial solution for this eigenvalue system, with an eigenvalue equal to 0.

However, the second generalized eigenvector $z_1$, which is the smallest non-trivial solution of this eigenvalue system, provides the desired segmentation that optimizes $N_{cut}$ for two clusters.

Given n random samples $x_1, x_2, \ldots, x_n$ of d-dimensional vectors from some unknown density function (f) and a kernel (K), an estimate for a true density can be obtained as:

$$\hat{f}(x) = \frac{1}{nh^d} \sum_{i}^{n} K\left(\frac{x-x_i}{h}\right), \quad (5)$$

where h is a bandwidth parameter that determines the scale of the selected kernel function. If we use a mean squared error (MSE) as a measure of efficiency of the density estimate, the tradeoff between bias and variance of the estimate is $$\text{MSE} = E[f(x)-f(x)]^2 = \text{Var}(f(x)) + \text{Bias}(f(x))]^2 \quad (6)$$

The bias is proportional to $h^2$ and the variance is proportional to $n^{-1}h^{-d}$, Wand et al., Kernel Smoothing, London, Chapman & Hall, 1995. Thus, for a fixed bandwidth estimator, one selects a value of the bandwidth parameter h that achieves an optimal tradeoff. We use a data driven bandwidth selection process for the estimation, generally described by Sheather et al., "A reliable data-based bandwidth selection method for kernel density estimation," J. R. Statist. Society, 1991.

Unusual Event Detection

As shown in FIG. 1, the invention provides a method 100 for detecting times of occurrences of foreground, unusual events $C_2$ among a background, usual events $C_1$, from a time series of samples.

In a preliminary step, features ( . . . A . . . Z . . . ) 102 are extracted 105 from multimedia 101. The extracted features 102 are labeled using a set S of discrete labels, i.e., an alphabet of $C_1$ and $C_2$ is the set

S={A, B, C, D, E, . . . , X, Y, Z}.

Alternatively, the labels can be continuous. The features 102 are treated as a time series that define the underlying multimedia content 101 for the purpose of our event detection.

It should be noted that multiple synchronized time series can be used, for example, one series indicates nothing but audio volume, while another series distinguishes speech, music, silence, and non-speech. Speech can further be classified as female or male speech. Sound classifications can also be a mixture of audio signals, for example, simultaneous cheering and speech, or simultaneous applause and speech, or simultaneous applause and cheering and excited, high-pitch, loud speech. These time series can be used in conjunction with other time series for the video portion. Visual time series can include dominant color and level of motion as features.

For an audio portion of the multimedia, audio features can include pitch, amplitude, Mel frequency cepstral coefficients (MFCC), speech, music, or speech and music. For a video portion, the features can include color, motion, texture, etc. The features can include MPEG-7 descriptors, if the video is compressed. As an advantage, these features are present in almost any genre of multimedia.

The time series of features 102 are sampled 110 as multiple (N) 'samples' 113. The sampling uses a sliding window 111 of length $W_L$, and a step size $W_S$ 112 applied to the time series data. For example, the window is eight seconds, and every step moves the window forward four seconds. These parameters can be specified in terms of labels, frames, or time. In the preferred embodiment of the invention, the sampling is uniform. For each step, the sample in the window defines a 'context' of the multimedia.

A context model 121 is constructed 120 for each of the N samples 113 or 'context'. The modeling can use discrete or continuous statistical functions. The models 121 are, of course, also time series.

An N×N symmetric affinity matrix W 131 is determined 130 for the entire time series using the context models 121, and a commutative distance metric d 122 measured between all possible pairs of context models. The affinity matrix 131 represents a graph where each node is one of the models 121, and a weight on an edge connecting two nodes is $$\exp\left(-\frac{d}{\sigma^2}\right)$$

where d is the predetermined distance metric, and the parameter $\sigma$ controls how quickly the similarity falls off.

Figure 2:
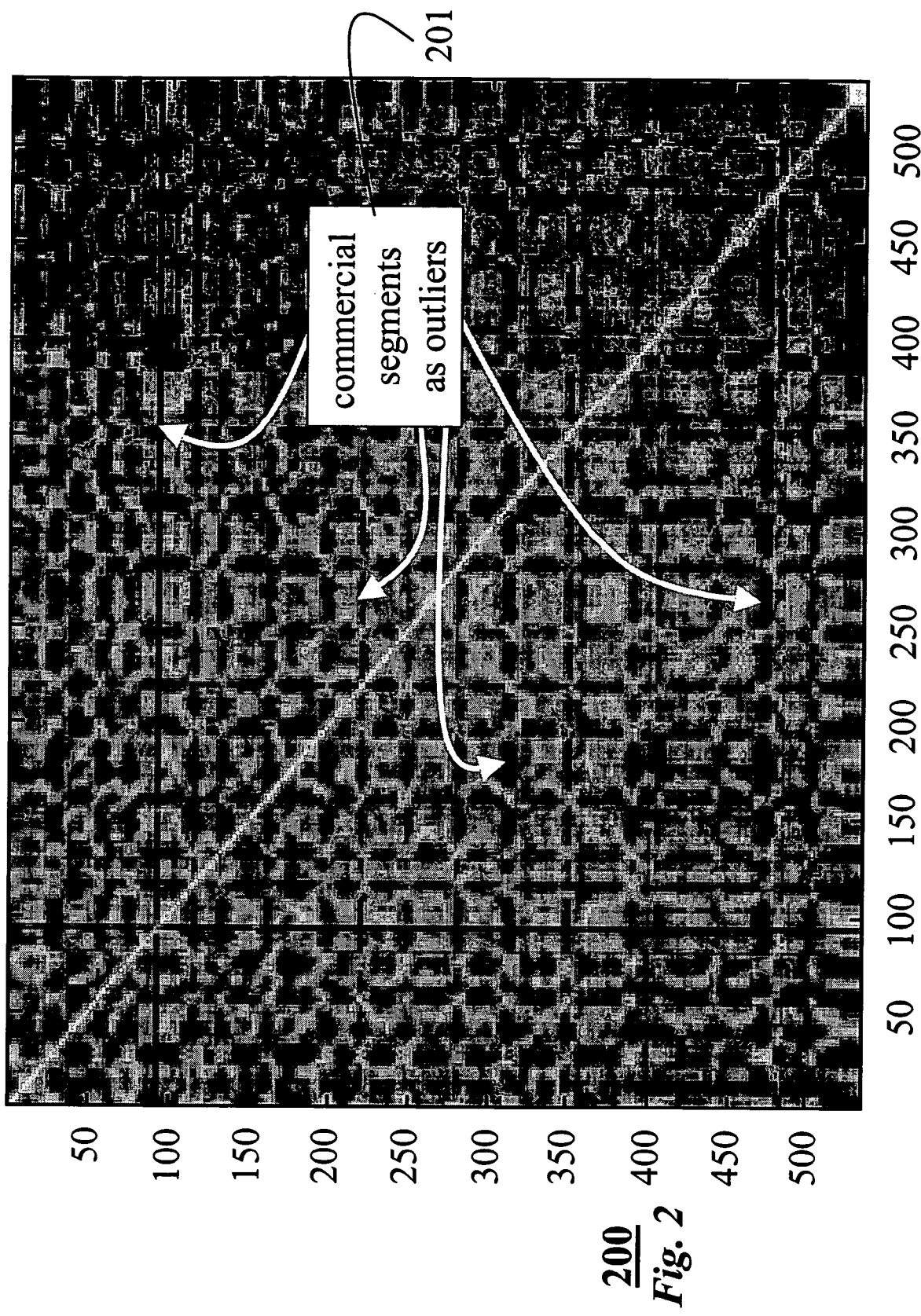
FIG. 2 is an affinity matrix according to the invention.

FIG. 2 shows an example affinity matrix 200 where the pixel intensities correspond to the distances d. That is, a lighter pixel indicates a small distance between a pair of models, and a darker pixel a larger distance. The axes basically express time. Obviously, the distance values along the diagonal are zero.

The second generalized eigenvector $z_1$ 141 is determined 140 for the affinity matrix 131. The second generalized eigenvector is then used to cluster 150 the distances related to events 151. Events that are 'outliers' are considered unusual, and these can be ranked. The eigenvector can be determined by a decomposition of the affinity matrix using, e.g., singular value decomposition or principal component analysis.

The ranked events 151 can be used to summarize 160 the content of multimedia 101 as an abstract or summary 161.

Affinity Matrix

FIG. 2 shows an affinity matrix 200 for a three-hour long video of golf. We use a two-state HMM to model 120 each time series of one hundred and twenty classification labels ($W_L$) with a step size ($W_S$). The affinity matrix 200 is constructed using the pair wise likelihood distance metric defined above. Note that the affinity matrix shows darker regions against a mostly lighter background. The dark 'streaks', i.e., outliers, are verified to be times of occurrences of commercials 201.

The detected outliers yield a coarse segmentation of the entire video into two clusters: the segments that represent the background program or usual events, and the segments that represent the foreground commercials or unusual events. Such a coarse segmentation is possible because we use a time series of medium level features, e.g., speech and non-speech, instead of low-level features such as volume. The use of low-level audio features brings out some fine scale changes that are not relevant for distinguishing program segments from non-program segments. For instance, low-level features can distinguish two different speakers in the content, while a more general speech label groups the features as one speaker.

A hierarchical clustering, according to the invention, is described below. The hierarchical clustering eliminates fine scale changes.

Issues

In the method 100 according to our invention, the following issues are considered: the statistical models 121 for the context, the choice of the two parameters, $W_L$ and $W_S$, and the features to be extracted.

A simple unconditional probability distribution function (PDF) suffices as the context model in the case of a memoryless background process. However, if the background process has some memory, the selected model would have to account for the background process. For instance, a hidden Markov model can provide a first order approximation of the background process.

The choice of the two parameters ($W_L$ and $W_S$) can be determined by a confidence measure that indicates whether a particular event is 'unusual'. A length of the sampling window $W_L$ determines a reliability of the statistical model for the context within the window. The size of the step $W_S$, determines a resolution at which the unusual events are detected.

Confidence Measure on Detected Unusual Events

In our method 100, we first estimate parameters of the background process from the samples within the window of length $W_L$. Then, we measure how different a particular model is from other context models. The difference is caused either by the samples from $C_2$ within the window $W_L$, or by a variance of the estimate of the background model. If the difference between two context models is 'substantially higher than allowed' by the variance of the estimate itself, then we are 'substantially confident' that the variance is due to the 'corruption' of one of the contexts with samples from unusual events $C_2$.

In the following, we quantify 'substantially higher than allowed', and 'substantially confident', in terms the window length $W_L$.

Confidence Measure for Binomial and Multinomial PDF Models

For the background process to be modeled by a binomial or multinomial PDF, the features 102 have discrete labels $S=\{A, B, C, D, E, \ldots\}$, as shown in FIG. 1. Given a context for a window of length $W_L$ of samples, we can estimate a probability of each of the labels in S using a relative frequency definition of probability.

An unbiased estimator for a probability of the label A is represented by $\hat{p}_A$. The value $\hat{p}_A$ is a binomial random variable that can be approximated by a Gaussian random variable with mean $p_A$ and a variance $$\sqrt{\frac{p_A(1-p_A)}{W_L}} \text{ when } W_L \geq 30 \text{ labels.}$$

As described above, we are interested in knowing the confidence interval of the random variable d, which measures the difference between two estimates of context models. For mathematical tractability, let us consider the Euclidean distance metric between two PDFs, even though the metric is only a monotonic approximation to a rigorous measure such as the Kullback-Leibler distance $$d = \sum_{i \in S} (\hat{p}_{i,1}) - (\hat{p}_{i,2})^2. \tag{7}$$

Here, $\hat{p}_{i,1}$ and $\hat{p}_{i,2}$ represent estimates for the probability of the $i^{th}$ label from two different contexts of length $W_L$. Because the estimates $\hat{p}_{i,1}$ and $\hat{p}_{i,2}$ are both Gaussian random variables, d is a $\chi^2$ random variable with n degrees of the freedom, where n is a cardinality of the set S.

Now, we assert, with substantial probability $$N \% = \int_L^U f_{\chi_n^2}(x) dx, \tag{8}$$

that any estimate of (d) lies in a closed interval [L, U]. In other words, we are N % confident that the difference between two context model estimates outside this interval is caused by an occurrence of an unusual event $C_2$ in one of the contexts. Also, we can rank all the outliers using the probability density function of d.

Verification

To verify the above analysis, the following simulation can be performed. We generate two contexts of length $W_L$ from a known binomial or multinomial PDF, assumed to be a background process as defined above. The models estimated from these two contexts are represented by $M_1$ and $M_2$, respectively. Then, we use 'bootstrapping' and kernel density estimation to verify the analysis on PDF of d as described below:
1. Generate $W_L$ labels from $M_1$ and $M_2$;
2. Re-estimate the model parameters $\hat{p}_{i,1}$ and $\hat{p}_{i,2}$ based on the generated data and determine the commutative distance metric (d) for comparing two context models;
3. Repeat steps 1 and 2, N times; and
4. Obtain the PDF of d, $\hat{p}_{i,1}$ and $\hat{p}_{i,2}$ from the kernel density estimation.

Feature Identification

The above clustering technique can also be used to systematically gain domain knowledge. This makes feature selection systematic instead of ad-hoc. For example, we use the audio portion of a sports video. We extract spectral or cepstral features from the audio portion and treat the features as a time series, as described above.

Using the time series clustering framework, we obtain distinguishable clusters for the selected features. That is, each cluster is a particular class of sound, e.g., cheering, speech, excited speech and cheering, cheering and applause, or just applause alone. Then, by examining the individual clusters, we identify consistent patterns in the features that correspond to unusual events, and build supervised statistical learning models based on the identified features. For example, we demonstrate that the class 'excited speech and cheering' is a better indicator for an unusual event in a sports video than just the class 'cheering'. Therefore, better results can be obtained by selecting the class 'excited speech and cheering' for the training data.

Figure 3:
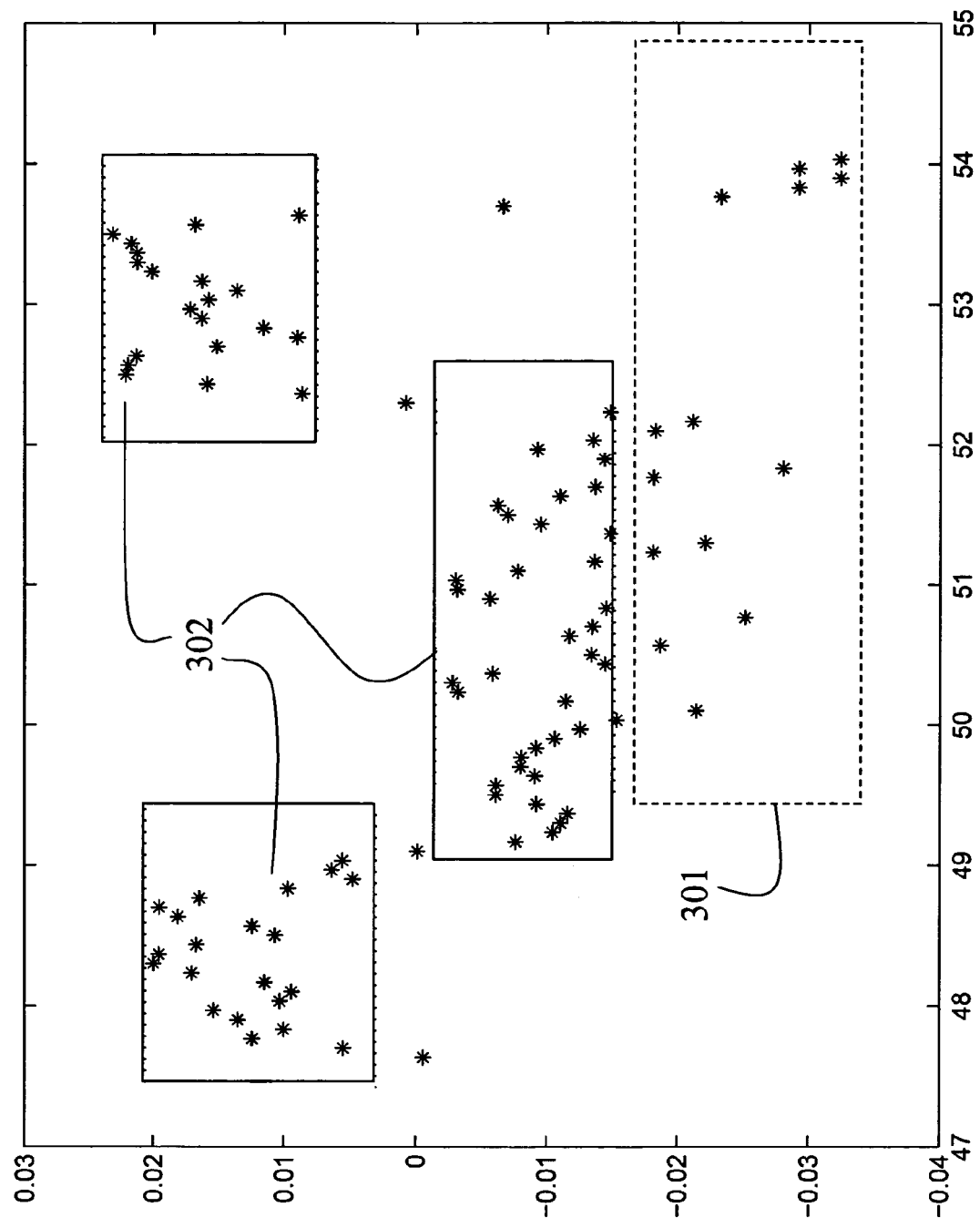
FIG. 3 is a graph of clustered features.

FIG. 3 shows an example of how such a framework can be used for the selection of classes of features. The vertical axis is an indicator for cluster membership while the horizontal axis indicates the corresponding time of occurrence of time series samples.

The second generalized eigenvector of the affinity matrix for the example sports video shows 'applause' outliers 301 at times of occurrences of video segments including applause. Furthermore, there are distinct clusters for the segments corresponding to speech features 302, from, obviously, different speakers. We consider these clusters to be irrelevant for the purpose of detecting unusual events. Hence, the clusters 302 should be grouped under a single label by training a speech Gaussian mixture model (GMM) using training data collected from different speakers.

Such an analysis brings out the interaction between different clusters of features and enables the selection of relevant features or that can help detect unusual events.

After target feature classes have been selected, we can use GMMs to parameterize a distribution of features. We describe a theory behind minimum description length Gaussian mixture models (MDL-GMMs), which is one way to determine the number of mixture components for GMMs.

Minimum Descriptor Length GMM

The parameters of the MDL-GMMs are obtained by minimizing Rissanen's objective function. This objective function is a trade-off between model complexity and goodness of fit of the model to the samples. For audio classification based unusual event detection, MDL-GMMs outperform GMMs with an arbitrary number of features, i.e., audio mixture components. Therefore, we use MDL-GMMs for modeling a distribution of features of the unusual audio class.

An objective function for obtaining an optimal number of mixture components and model parameters is derived as follows. Let Y be an M-dimensional random vector to be modeled using a Gaussian mixture distribution. Let K denote the number of Gaussian mixtures. We use the notation $\pi$, $\mu$, and R to denote respective parameter sets $\{\pi_k\}$, $\{\mu_k\}$, and $\{R_k\}$, for k=1 to K, for mixture coefficients, means and variances. A complete set of parameters is given by K, and $\theta=(\pi, \mu, R)$. A log of the probability of the entire sequence $Y=\{Y_n\}^N_{n=1}$ is $$\log p_y(y \mid K, \theta) = \sum_{n=1}^{N} \log\left(\sum_{k=1}^{K} p_{y_n \mid x_n}(y_n \mid k, \theta) \pi_k\right).$$

The objective is to estimate the parameters K and $\theta \in \Omega^{(K)}$. A maximum likelihood (ML) estimate is given by $$\hat{\theta}_{ML} = \arg\max_{\theta \in \Omega^{(K)}} \log p_y(y \mid K, \theta),$$

and the estimate of K is based on minimizing is $$MDL(K, \theta) = -\log p_y(y \mid K, \theta) + \frac{1}{2} L \log(NM),$$

where L is the number of continuously valued real numbers required to specify the parameter $\theta$. In this application, $$L = K\left(1 + M + \frac{(M+1)M}{2}\right) - 1.$$

Confidence Measure for GMM & HMM Models

If the samples of the memoryless background process are continuous labels, instead of discrete labels, then one can use continuous labels and model the PDF of the process using a Gaussian mixture model (GMM). If the process has first order memory, then one can model its first-order PDF using a hidden Markov model (HMM).

Let $\lambda=(A, B, \pi)$ represent the model parameters for both the HMM and GMM, where A is a state transition matrix, B is a sample label probability distribution, and $\pi$ is an initial state distribution. For the GMM, A and $\pi$ are equal to 1, and B represents the mixture model for the distribution. For the HMM with continuous samples, B is a mixture model in each of the states. For the HMM with discrete labels as samples, B is a multinomial PDF in each of the states.

Even when two context models 121 have different parameters, the models can be statistically equivalent. Hence, the following commutative distance metric d is used to compare two context models $\lambda_1$ and $\lambda_2$ constructed from sample sequences or samples $O_1$ and $O_2$, respectively, $$d(\lambda_1, \lambda_2) = 1/W_L(\log P(O_1 \mid \lambda_1) + \log P(O_2 \mid \lambda_2) - \qquad (9)$$

$$\log P(O_1 \mid \lambda_2) - \log P(O_2 \mid \lambda_1)).$$

The first two terms in the distance metric measure the likelihood of training data given the estimated models. The last two cross terms measure the likelihood of observing O under $\lambda_1$, and vice versa. If the two models are different, then the cross terms are substantially smaller than the first two terms. The defined distance metric d does not lend itself to a similar analysis, as in the case of binomial and multinomial models that can help us find its PDF. Hence, we apply bootstrapping to obtain several observations of the distance metric and use kernel density estimation to obtain the PDF of the defined distance metric. In the Figures of the affinity graphs, the distances d are indicated as color intensities, i.e., darker colors are for larger distance, and white indicates a zero distance, such as along the diagonal.

Note that the support of the PDF decreases as $W_L$ increases from, e.g., 100 frames to 600 frames. The reliability of two context models for the same background process increases as the amount of training data increases, and hence, the variance of normalized log likelihood difference decreases. Therefore, it is possible to quantify any log likelihood difference value caused by corruption of observations from another process, e.g., the foreground process ($C_2$). Similar analysis shows the same observations hold for HMMs as context models as well.

Using Confidence Measures to Rank Outliers

Above, we describe the estimation of the PDF of a specific distance metric for context models, e.g., memoryless models and HMMs, used by our method. Then, for a given time series of samples for $C_1$ and $C_2$, we determine the affinity matrix for a selected window length of $W_L$ for the context model.

We use the second generalized eigenvector $z_1$ to detect inliers and outliers. Then, the confidence metric for an outlier context model, $M_j$ is determined as:

$$p(M_j \in O) = 1/\# I\left(\sum_{i \in I} P_{d,i}(d \leq d(M_i, M_j))\right), \qquad (10)$$

where $P_{d,i}$ is the density estimate for the distance metric using the samples of the inlier context i. The values O and I represent the set of outliers (unusual events) and inliers (usual events), respectively. The symbol #I represents the cardinality of the set of inliers.

If the density estimate obtained, either through bootstrapping and kernel density estimation or through a similar analysis as for binomial and multinomial cases, has finite support, then some of the outliers, which are very distinct from the inliers and cannot be ranked as $P_{d,i}(d \leq d(M_i, M_j))d$, are equal to one. In such cases, the distance itself can be used to rank the outliers.

The order of ranking is not affected by the use of $d(M_i, M_j)$, instead of $P_d(d \leq d(M_i, M_j))$ because the cumulative distribution function (CDF) is a monotonically increasing function. However, the use of $d(M_i, M_j)$ can make it more difficult to merge ranked lists as the meaning of $d(M_i, M_j)$ is dependent on the background.

Identifying Features

In order to identify useful features for detecting unusual events, we perform a hierarchical clustering by using a normalized cut on the affinity matrix. The affinity matrix is a representation of the similarities between every pair of nodes in a graph where each node represents a context model and the edge connecting any two nodes in the graph is weighted by the similarity between them. Normalized cuts provide optimal solutions for the partitioning of this graph that emphasize cluster dissimilarity while maintaining intra-cluster similarity.

Figure 4:
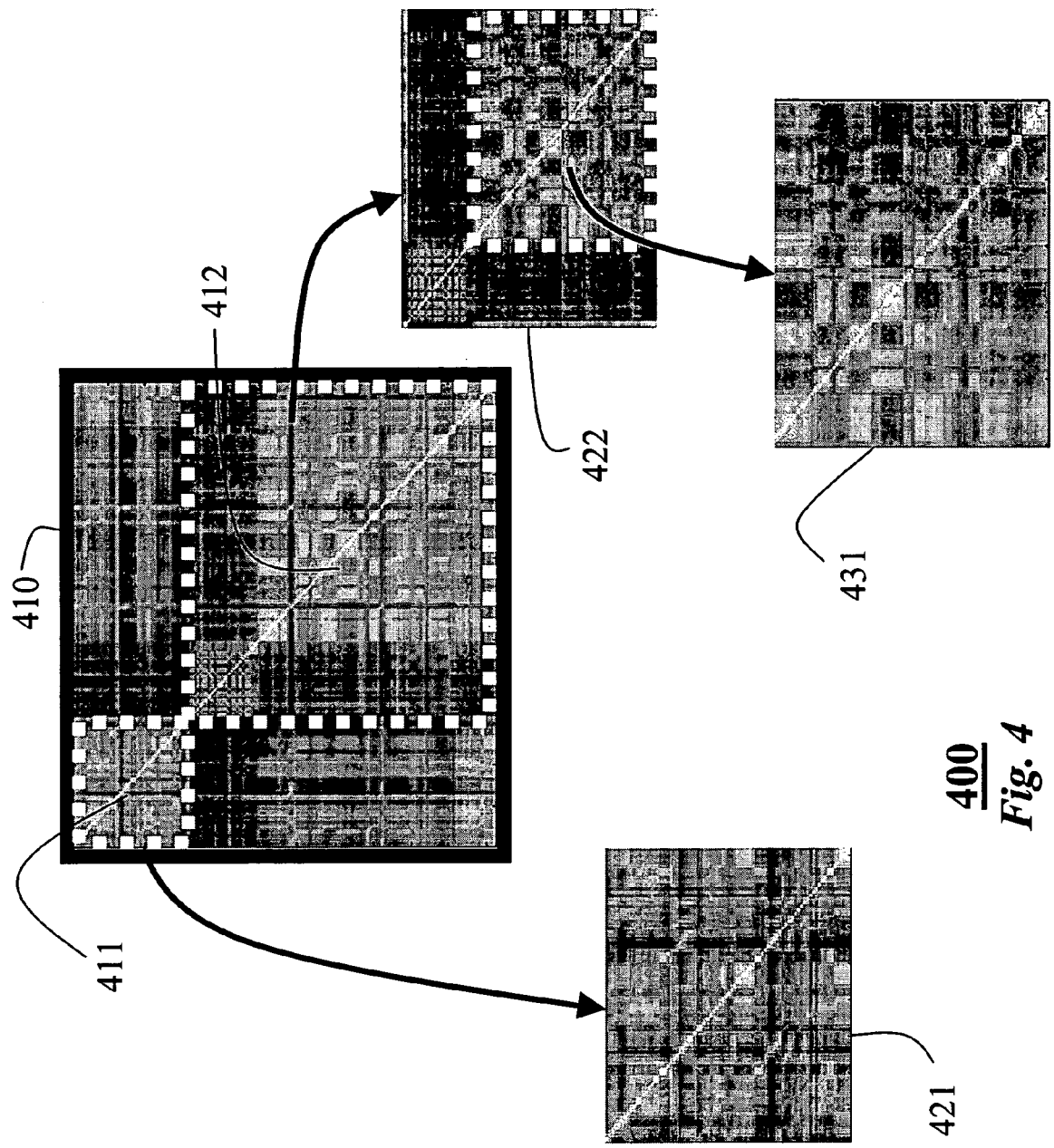
FIG. 4 is a hierarchical representation of an affinity matrix.

As shown in FIG. 4, we partition the affinity matrix 410 in the following way. We first partition the affinity matrix into two individual clusters 411 and 412 using the normalized cut solution (second generalized eigenvector). Because the first affinity matrix (the parent affinity matrix) represents the similarity between every pair of nodes, we can construct affinity matrices 421 and 422 for the two identified clusters of the parent affinity matrix 410 by picking the corresponding elements from the parent affinity matrix. For instance, to construct the affinity matrix for a particular partition, we pick the row corresponding to each cluster member of this partition in the parent affinity matrix and construct the affinity matrix that constitutes only the similarities of this member with itself and other cluster members of the partition.

FIG. 4 shows the affinity matrices in a hierarchical representation 400 for fifteen minutes video of a Japanese baseball game. In this figure, a root node 410 is the affinity matrix for the entire video. Note the mostly uniform lighter pixel intensifies in the partitions 411 and 412. The two child nodes 421 and 422 are affinity matrices extracted from the root node 410 using these partitions. These nodes represent portions of the video with mostly a consistent background process, for example the playing of the baseball game, which is of interest for detecting unusual events. The streakier, darker intensities in the remaining portions of the affinity matrix are probably associated with commercials during breaks between innings, and should be ignored for the purpose of unusual event detection.

The spectral clustering, as described above, then can be applied again to the resulting affinity graphs 421 and 422 associated with each child node resulting in a next generation affinity matrix 431.

Figure 5:
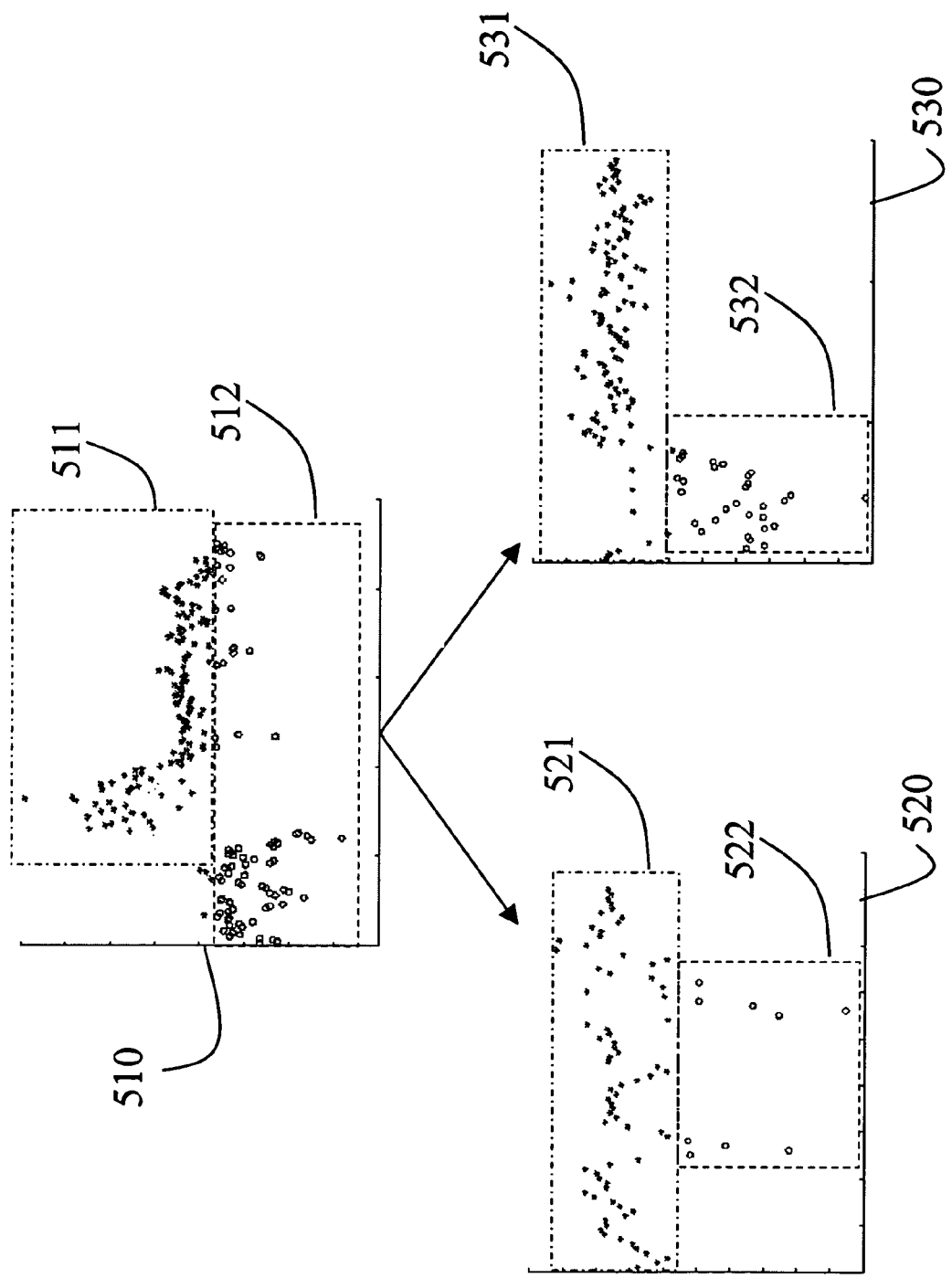
FIG. 5 is a graph of clustered features of the hierarchical representation of FIG. 4.

This process reveals the features as shown in FIG. 5. In FIG. 5, the vertical axis is the cluster indicator value and the horizontal axis is time. The graph 510 represents the parent affinity matrix 410, and the graphs 520 and 530 represent the partitioning for each of the clusters 421 and 422 from the parent affinity matrix 410. In each graph, the events can be grouped into clusters for usual events (511, 521, and 531) and unusual events (512, 522, and 532).

The cluster of unusual events 522 in the graph 520 turns out to represent the 'highlights' of the sports video. The identification of the significant features of these events, as described above, yields sufficient information to be used as training data for detecting unusual events in a particular genre of multimedia. We train a Gaussian mixture model, using the minimum description length principle, to model the distribution of low-level cepstral features in the 'highlight' class. We can then use the aforementioned GMM to classify the sports video into 'highlight' and 'non-highlight' segments.

Figure 6:
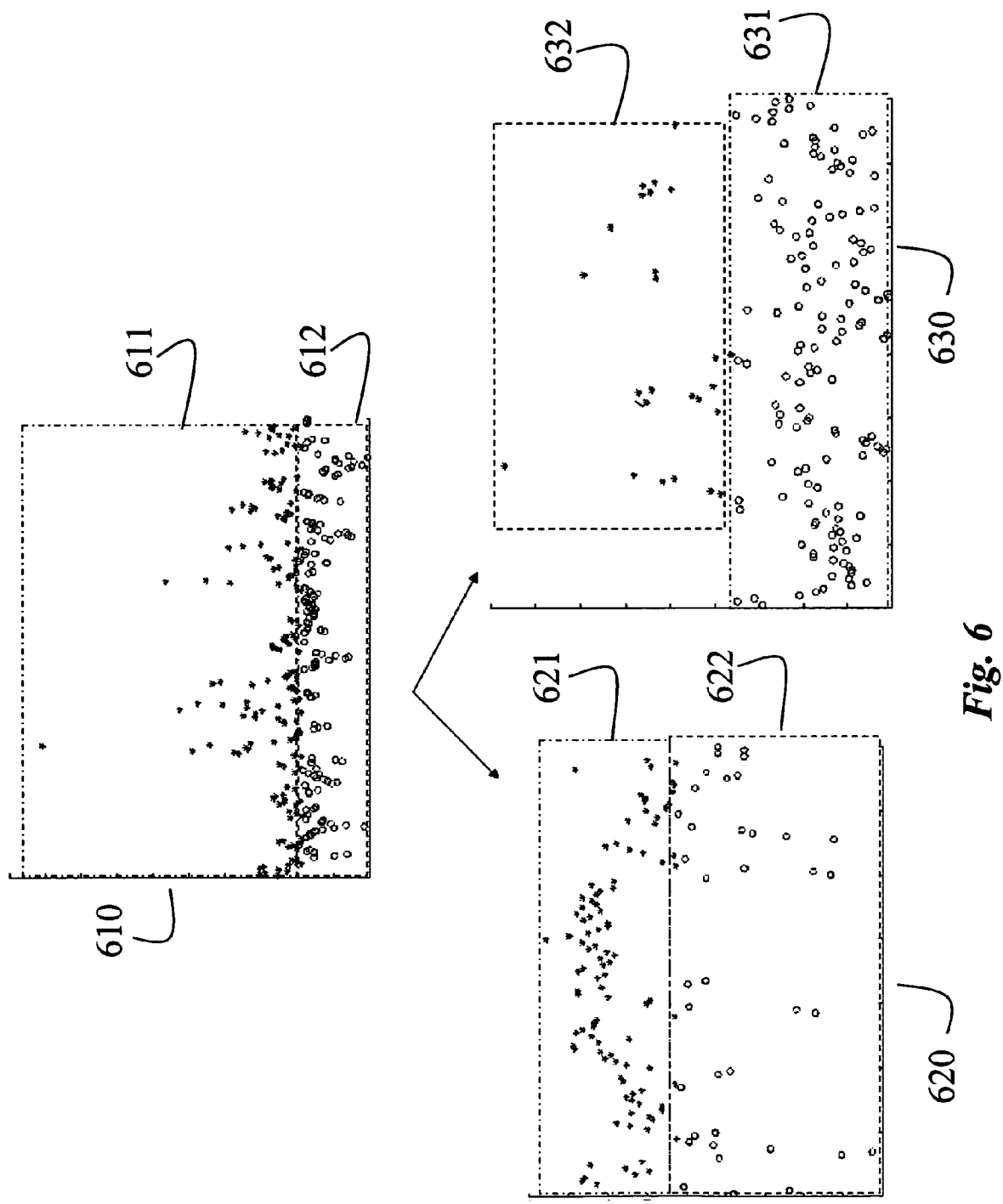
FIG. 6 is a graph of clustered features of another hierarchical representation of FIG. 4.

FIG. 6 reveals the success of this scheme in bringing out highlight moments as outliers for a second example, this time a Japanese baseball game. The graph 610 represents a parent affinity matrix, and the graphs 620 and 630 represent the partitioning for each of two clusters from the parent affinity matrix. In each graph, the events are grouped into clusters for usual events (611, 621, and 631) and unusual events (612, 622, and 632). The cluster of unusual events 622 in the graph 620 turns out to represent the 'highlights' of the baseball game, while the cluster of events 632 in the graph 630 represent time series where the commentator is silent.

FIG. 7 is the result of outlier detection in a third example, a soccer match clip. The parent affinity matrix 710 is represented by the graph 720. In the graph 720, the events are grouped into clusters for usual events 721 and unusual events 722. The cluster of unusual events 722 in the graph 720 turns out to represent the 'highlights' of the soccer match.

Figure 8:
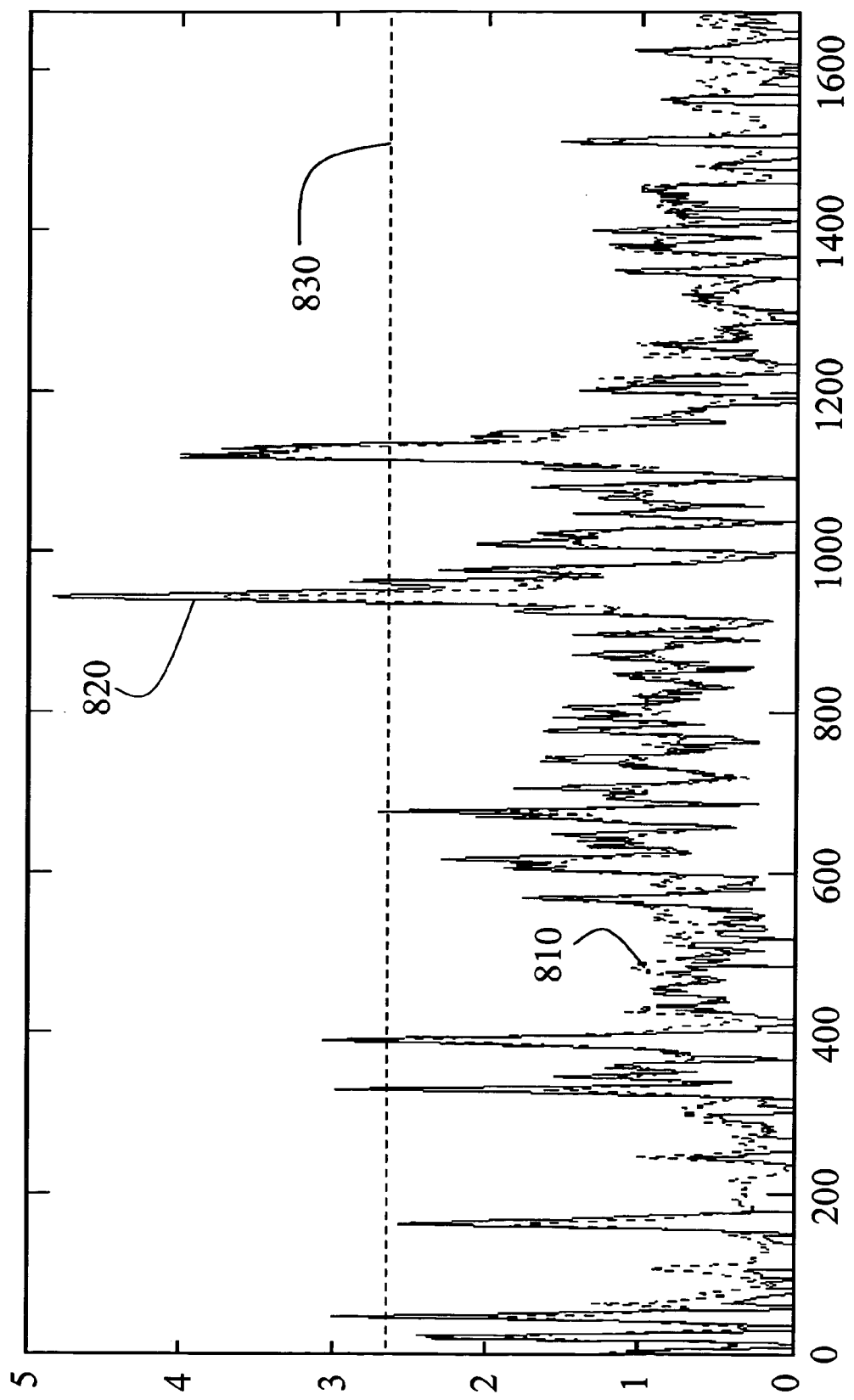
FIG. 8 is a graph comparing ranked features.

As shown in FIG. 8, we use the percentage of these audio features in a window of 12 seconds (that slides forward in time by one second at each step) to rank every second of an input sports video. In FIG. 8, the vertical axis is the percentage of the key audio class used to measure 'interest-ing-ness' of a one-second segment in the input video, and the horizontal axis is time.

The dashed curve 810 in FIG. 8 shows the ranking for every second of input video using the percentage of the 'highlight' labels. FIG. 8 also shows, using the solid curve 820, the ranking for every second of input video using the percentage of cheering and applause labels. By setting the same highlights selection threshold 830 for these two ranking schemes, we can get 'interesting' time segments. i.e., segments that have a rank greater than the chosen threshold 830, to summarize the video.

Figure 9:
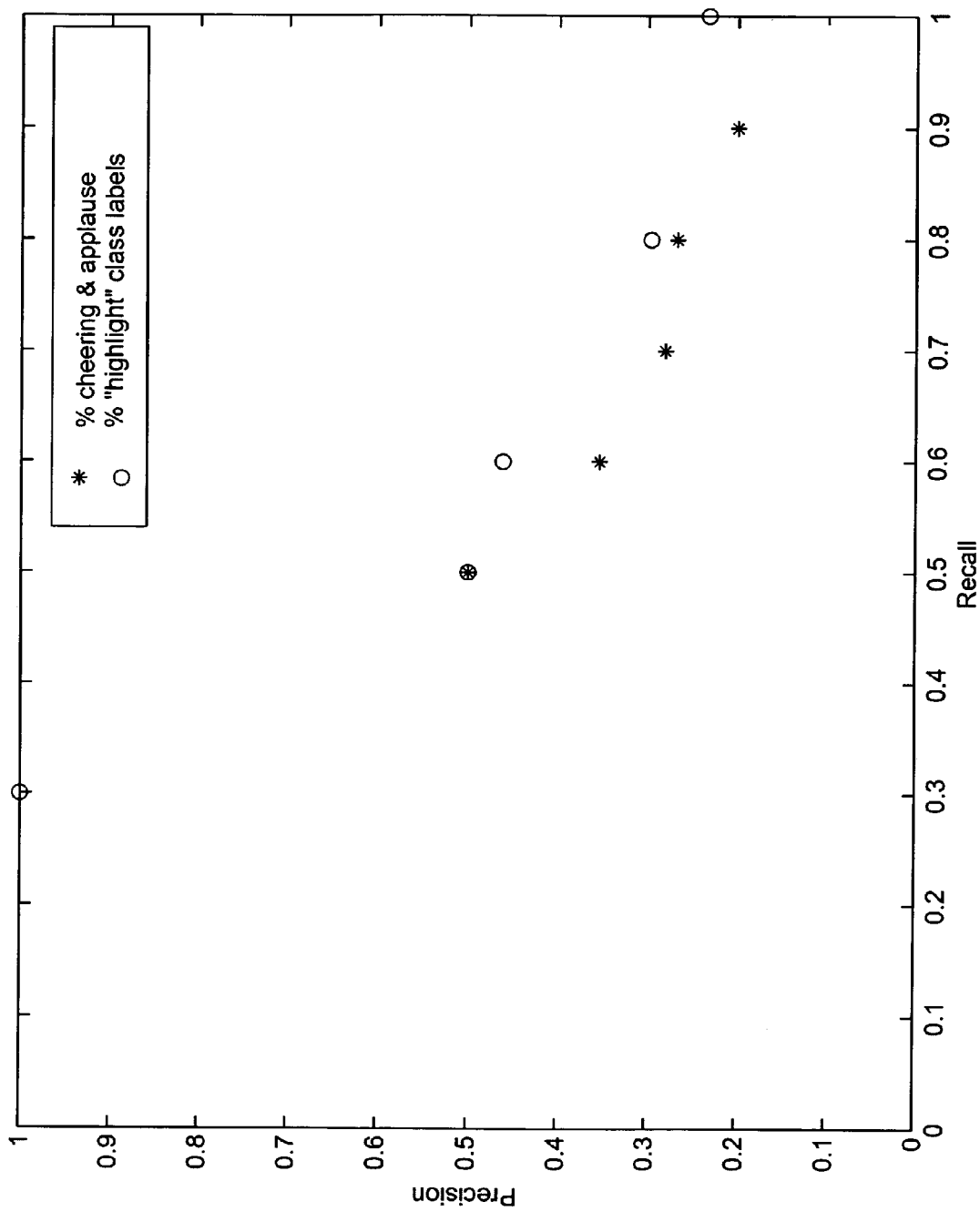
FIG. 9 is a precision-recall graph for a sports video.

In FIG. 9, the vertical axis is precision (the number of highlight segments in the summary divided by the total number of segments in the summary), and the horizontal axis is recall (the number of highlight segments in the summary divided by the number of highlight segments in the whole video). As shown in FIG. 9, we get a better precision-recall performance using the percentage of 'highlight' class labels for ranking as compared to the precision-recall performance using the percentage of cheering and applause for ranking.

Now that we have a 'highlight' class that gives us a superior precision-recall performance, we can interpret the meaning of the MDL-GMM of this class by inferring what each mixture component of the GMM is modeling for the given training data set. Towards that end, we look at the MDL-GMM learned from the training data for the 'highlight' class.

The MDL solution for the number of components in the GMM for the 'highlight' audio class data set is four. In order to interpret each of these four mixture components, we need to assign every frame of audio in the training data set to one of the mixture components. Then, by listening to all the frames that belong to a particular mixture component one can interpret what sound class is being modeled by that mixture component.

In order to assign every audio frame to a mixture component, we extract the feature $(y_n)$ from which the GMM was learned. Given an input feature vector, $y_n$, a K component GMM, and learned parameters, μ, we determine a probability that a mixture component k, generated the feature $y_n$ by using Bayes' rule:

$$p(k/y_n, \theta) = \frac{p(y_n/k, \theta)\pi_k}{\sum_{k=1}^{K} p_{yn}(y_n | k, \theta)\pi_k}.$$

Then, we assign the feature $y_n$ to the mixture component for which the posterior probability ($p(k/y_n, \theta)$) is a maximum. After we collect all the audio frames corresponding to each of the mixture components, we interpret the semantic meaning of every component by listening to the sounds that are being modeled by each mixture component.

Thus, we infer the mixture component for the 'highlight' audio class using the MDL-GMM. We find that one of the components predominantly represents the excited speech of the commentator and another component represents the cheering of the audience. This is evidence that the key 'highlight' class is a mixture of audience cheering and the commentator's excited speech. In addition, our method reveals that when there is only cheering from the audience, it is less likely due to an unusual event. In other words, a video segment is classified as a highlight only if both the audience and the commentator are excited. Such a result is intuitively satisfying.

Application to Sports Video

As described above, 'unusual' events in sports video happen occasionally among a background of the usual process. In a golf game, the usual process is the commentator's speech in a quiet background. In a soccer game, the usual process is the commentator's speech in a relatively noisy background. But, in order to extract unusual program segments, e.g., commercials, from the whole video, we use our method at a coarser scale as described below, based on the observation that commercials are 'unusual' in the background of the whole program.

Event Detection Using One-Second-Level Labels

Because our method assumes that the background process is relatively stationary, our first step is to cluster the time series from the whole sports video to identify contiguous sections of the time series that have the same background.

Detecting Unusual Events

Unusual events, together with an audience reaction, in a sports video typically last for only few seconds. This implies that we cannot use second-level classification labels to extract short unusual events. If we use second-level classification labels, the size of $W_L$ has to be small enough to detect events at that resolution. However, our analysis on the confidence measures above, indicates that a small value of $W_L$, lead to a less reliable context model.

Therefore, we have at least the following two options: process the time series using frame-level classification labels, instead of medium-level labels, or process the time series using low-level MFCC features. Clearly, using the frame-level classification labels is computationally more efficient. Also, as described above, working with labels can suppress irrelevant changes in the background process, such as different speakers.

Application to Surveillance Video

In the case of a sports video, we can use some a priori knowledge about the application domain to train sound classes such as applause, cheering, etc., to extract additional time series apart from the time series of low-level features.

In a surveillance video, the type of sounds that can characterize unusual events cannot always be anticipated. However, our method provides a systematic methodology to acquire domain knowledge to identify 'distinguishable' classes of sounds. Without any apriori knowledge, we use low-level features in such scenarios to effectively characterize the domain and detect events.

Overview of Invention

Figure 10:
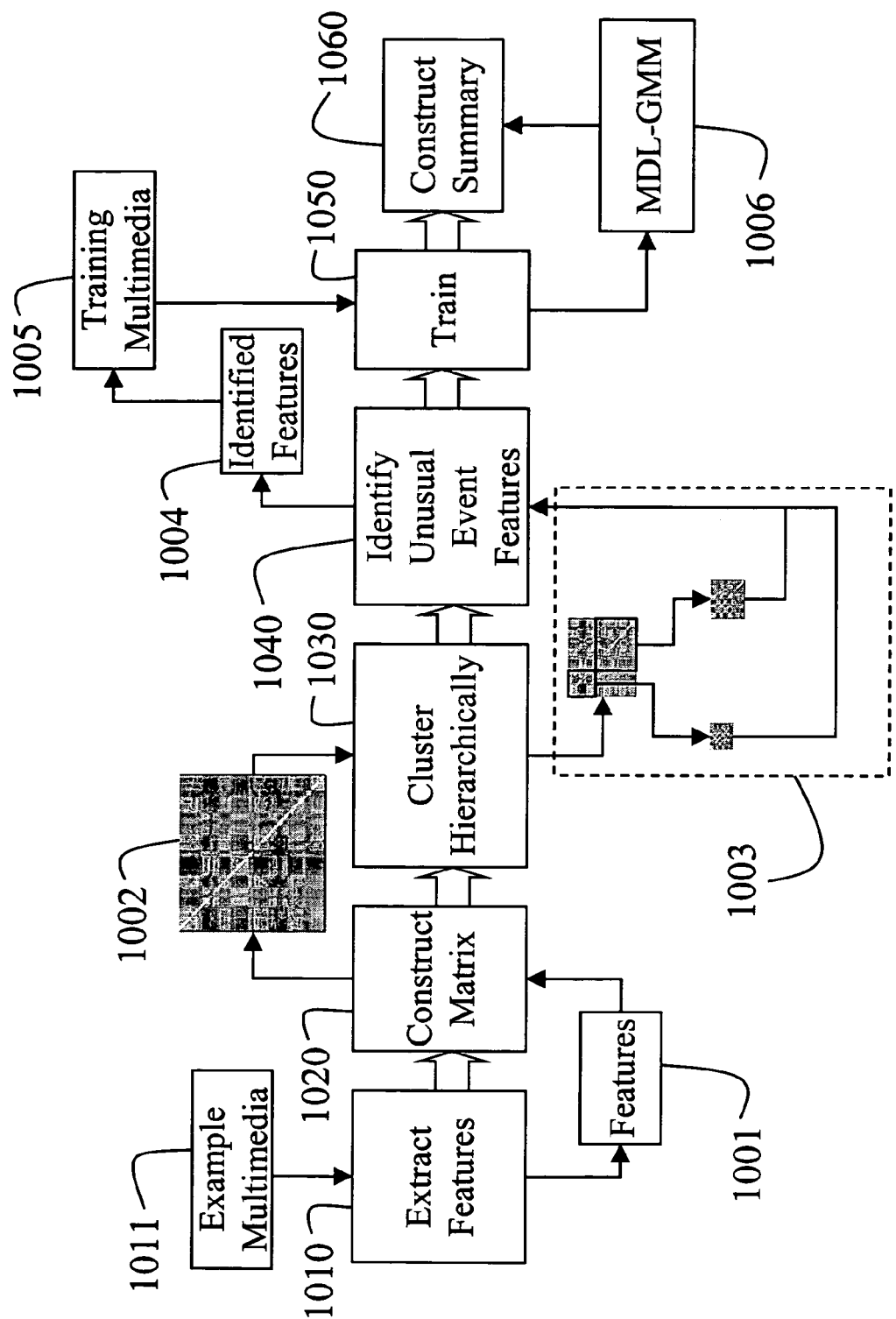
FIG. 10 is a flow diagram of a method for training a model to summarize a video.

As shown in FIG. 10, we extract 1010 features 1001 from an example multimedia 1011 for a particular genre, e.g., a sports video. We treat the features as time series data. Optimally, the features can be further processed, for example, using windowing and modeling, to reveal higher level characteristics and relationships of the extracted features 1001.

In any case, the time series data is used to construct 1020 an affinity matrix 1002. The affinity matrix is clustered hierarchically 1030 using the partitioning process 1003 as described above to identify 1040 features 1004 associated with unusual events.

We collect training data 1005 for the identified features, and use the training data to train 1050 model a MDL-GMM 1006. The MDL-GMM is used to construct 1060 a summary of the highlights in the example multimedia 1011.

We interpreted the semantic meaning of each of the mixture components of the learned GMM to find out that the 'highlight' class models the selected feature. Using the selected features, we reduce the number of unusual events that would otherwise be classified as false positives.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A computer-implemented method for detecting events in multimedia, comprising the steps of:
    extracting features from the multimedia;
    sampling the features using a sliding window to obtain a plurality of samples;
    constructing a context model for each sample;
    determining an affinity matrix from the models and a commutative distance metric between each possible pair of context models;
    determining a second generalized eigenvector for the affinity matrix;
    clustering the plurality of samples into events according to the second generalized eigenvector; and
    generating a summary of the multimedia according to the events.

2. The method of claim 1, in which the features represent usual events of a background process and unusual events of a foreground process.

3. The method of claim 1, further comprising:
    labeling the features with labels.

4. The method of claim 3, in which the labels are discrete.

5. The method of claim 3, in which the labels are continuous.

6. The method of claim 1, in which the multimedia includes an audio portion and audio features are selected from the group consisting of pitch, amplitude, Mel frequency cepstral coeficients (MFCC), Modified Discrete Cosine Transform (MDCT) coefficients from an ac-3 stream, speech, and music.

7. The method of claim 1, in which the multimedia includes a video portion, and video features are selected multimedia from the group consisting of color, motion, texture, and MPEG-7 descriptors.

8. The method of claim 1, in which the sliding window has a length $W_L$, and a step size $W_S$, and wherejn the length $W_L$ determines a reliability of the context model, and the step size $W_S$ determines a resolutlon of the events.

9. The method of claim 1, in which the second generalized eigenvector ranks the events.

10. The method of claim 9, fruther comprising:
    summarizing the multimedia according to the ranked events.

11. The method of claim 2, in which the background process is memoryless, and the context model is an unconditional probability distribution function.

12. The method of claim 2, in which the background process has memory, and the context model is a hidden Markov model.

13. The method of claim 1, in which the context model is a Gaussian mixture model.

14. The method of claim 1, in which the sliding window has a length $W_L$, and the commutative distance metric d for each pair of context models $\lambda_1$ and $\lambda_2$ constructed from samples $O_1$ and $O_2$, respectively is $$d(\lambda_1, \lambda_2) = 1/W_L(\log P(O_1 \mid \lambda_1) + \log P(O_2 \mid \lambda_2) - \log P(O_1 \mid \lambda_2) - \log P(O_2 \mid \lambda_1)).$$

15. The method of claim 1, in which the multimedia is a sports video and the events are significant events.

16. The method of claim 15, in which the events include excited speech and cheering.

17. The method of claim 1, in which the multimedia is a surveillance video and the events are unusual events.

* * * * *